United States Patent [19]

Klagane et al.

[11] 4,351,104
[45] Sep. 28, 1982

[54] METHOD FOR MANUFACTURING MAGNETIC HEADS

[75] Inventors: Kiyoshi Klagane, Funabashi; Masao Kakizaki, Chiba, both of Japan

[73] Assignee: TDK Electronics Co., Ltd., Tokyo, Japan

[21] Appl. No.: 205,232

[22] Filed: Nov. 10, 1980

[30] Foreign Application Priority Data

Nov. 12, 1979 [JP] Japan .................................. 54/146206

[51] Int. Cl.³ .............................................. G11B 5/42
[52] U.S. Cl. ........................................ 29/603; 65/43;
    65/57; 65/58; 156/74; 264/270; 264/311
[58] Field of Search ................. 29/603; 360/119–121;
    65/43, 57, 58; 427/240; 264/311, 270; 156/74

[56] References Cited

U.S. PATENT DOCUMENTS 2,686,390  8/1954  Williams et al. .................... 65/57
3,819,348  6/1974  Murray ............................ 29/603 X Primary Examiner—Carl E. Hall
Attorney, Agent, or Firm—Kenyon & Kenyon

[57] ABSTRACT

In the method for manufacturing annular portions of magnetic heads, a gap between the confronting end surfaces of the magnetic heads is filled with glass. In one of the conventional processes, the glass is sucked into the gap by a capillary action of the gap, but bubbles are liable to form in the glass. The method according to the present invention comprises a step of heating the glass to a relatively low temperature capable of causing the glass to be flowable and applying a centrifugal force to the glass being heated in a rotatable support of a heating furnace. As a result of the centrifugal force, the tendency to form bubbles is considerably reduced as compared with the conventional methods.

5 Claims, 11 Drawing Figures

METHOD FOR MANUFACTURING MAGNETIC HEADS

The present invention relates to a method for manufacturing annular portions of magnetic heads for magnetic recording, reproducing and erasing having a gap filled with glass or enamel, as well as the centrifugal heating furnace used in the manufacturing method.

It is known from U.S. Pat. No. 3,246,383 to fill the gap of a magnetic head with glass or enamel composed of $SiO_2$, $B_2O_3$, ZnO and PbO which are sucked into the gap by a capillary action of the gap. The manufacturing methods of the magnetic heads involve difficulties due to the fact that: it is difficult to fill the extremely small gap having an effective gap width of from 1 to 20 microns with glass or enamel; it is difficult to finish the gap width with a high accuracy, for example at a tolerance of ±10%, and; bubbles are liable to generate in the glass or enamel during the filling of the gap.

The present assignee filed and withdrew a Japanese patent application, in which, not only the capillary action of the gap of a magnetic head but also the effect of gravity is utilized to fill the gap with the glass or enamel.

However, in the manufacturing methods according to the U.S. Pat. No. 3,246,383 and the Japanese patent application mentioned above, an appreciable surface tension of the glass or enamel melt causes a problem which will be explained with reference to FIG. 1.

Referring to FIG. 1, the reference numeral 1 indicates a ferromagnetic material, for example sintered ferromagnetic oxide. The surface of the ferromagnetic material 1 is locally and slightly irregular, for example, due to an orientation difference between the polycrystal ferrite grains, a surface roughness, flaws, pores, contamination and foreign matters adhering to the surface. The action of the surface tension becomes, therefore, nonuniform on such an irregular surface and causes a detouring flow and sudden advance of the glass 2. As a result the bubbles 3 are liable to form.

It is an object of the present invention to effectively remove the disadvantages of the prior art methods for manufacturing the annular portions of magnetic heads having confronting gap surfaces and to provide a novel manufacturing method allowing filling a gap with glass or enamel without bubble formation within the gap.

It is another object of the present invention to provide a manufacturing method of the annular portions of magnetic heads allowing a uniform filling of the gap at such a relatively low temperature as causing no deterioration of the magnetic properties of the ferromagnetic material.

It is a further object of the present invention to provide a centrifugal heating furnace used for uniformly filling a gap of the magnetic heads with glass or enamel without causing the generation of bubbles.

In accordance with the objects of the present invention there is provided a method for manufacturing annular portions of magnetic heads composed of two magnetic circuit elements consisting of ferromagnetic material and having confronting gap surfaces with an extremely small gap there between filled with nonmagnetic material bonding the circuit elements together, comprising the steps of:

grooving at least one of ferromagnetic bodies so as to form said ferromagnetic elements;

assembling the ferromagnetic circuit elements with each other in such a manner that at least one spacer is selectively located between the confronting gap surfaces so as to leave an effective gap for filling of the nonmagnetic material;

placing a nonmagnetic bonding mass selected from the group consisting of glass and enamel in at least one of said grooves, outside of and adjacent to the effective gap;

placing the assembled ferromagnetic circuit elements in a furnace;

heating the assembled ferromagnetic circuit elements to a temperature which causes the nonmagnetic bonding mass to be flowable while applying a centrifugal force to the nonmagnetic bonding mass, thereby causing a forced flow of the nonmagnetic bonding mass into the effective gap;

cooling the heated ferromagnetic circuit elements; and;

subsequently mechanically cutting the bonded ferromagnetic circuit elements into a number of portions of the magnetic heads having the requisite gap width.

The centrifugal force is preferably in the range of from 5 to 50 G.

In an embodiment of the present invention, the assembled ferromagnetic circuit elements are rotated substantially horizontally in the heating step under the application of the centrifugal force.

In an embodiment of the present invention, the assembled ferromagnetic circuit elements are located at an offset position with respect to the rotation axis of the substantially horizontal rotation.

A centrifugal type heating furnace for manufacturing annular portions of magnetic heads comprises:

a vessel comprising heat-insulating material;

a rotatable support for portions of magnetic heads, located within said vessel;

a heater located between the inner surface of the vessel and the outermost trace drawn by the rotating movement of the rotatable support;

a stopper extending essentially in the direction of the rotation axis of the rotatable support and holding, at an offset position with respect to the rotation axis and against the centrifugal force, the portions of magnetic heads assembled with each other via at least one spacer located between the confronting gap surfaces and adapted to maintain an effective gap.

In an embodiment of the centrifugal type heating furnace, the furnace comprises a driving shaft of the rotatable support protruding through a slot of the vessel and detachably secured to the rotatable support at the rotation axis.

The preferable embodiments of the present invention is hereinafter explained in detail with reference to FIGS. 2 through 11.

Figure 1:
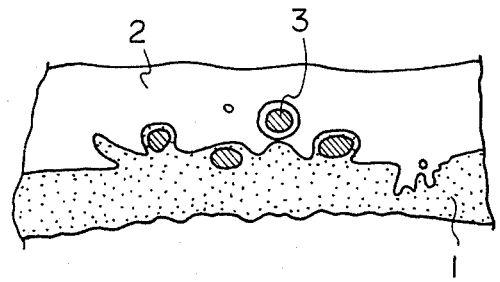
FIG. 1 is a partial, schematic cross sectional view of the ferromagnetic material and glass being filled in to the gap of a magnetic head according to the prior art manufacturing methods.
Figure 2:
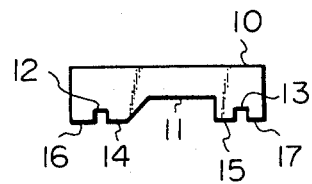
FIG. 2 illustrates a step of manufacturing method according to the present invention and shows a ferrite member, which is one of the magnetic circuit elements of magnetic heads.

Referring to FIG. 2, a ferromagnetic sheet, for example a sintered ferrite sheet 10, is grooved to form a channel groove 11. Then, the sintered ferrite sheet 10 is grooved to form the partition grooves 12 and 13 which divide the confronting gap surfaces into the effective gap surfaces 14, 15 and the gap width determining surfaces 16, 17. The effective gap surfaces 14, 15 and the gap width determining surfaces 16, 17 are finished to have a surface accuracy almost equivalent to a mirror surface.

Figure 3:
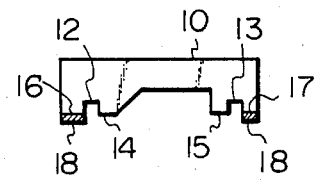
FIG. 3 illustrates another step and shows the other ferrite member having an evaporation film.

Referring to FIG. 3, the spacers 18 are deposited on the gap width determining surfaces 16, 17 by an evaporation method of SiO and the like, so that the evaporated SiO film and the like have a thickness necessary for the spacers. Since the thickness control of SiO is easy, a film of a high precision can be formed. Instead of the evaporated SiO film, a metal film, such as a titanium foil, may be interposed between the confronting gap surfaces.

Figure 4:
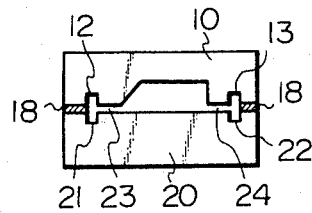
FIG. 4 illustrates another step and shows the assembled ferrite members.

Referring to FIG. 4, a sintered ferrite sheet 20, which is the magnetic circuit element other than the sintered ferrite sheet 10, is grooved to form the partition grooves 21 and 22, and is then butted against the sintered ferrite sheet 10. The sintered ferrite sheets 10 and 20 are pressed together by a not shown jig and is heated under the pressed state so as to assemble these sheets. The effective gaps 23 and 24 are left between the confronting gap surfaces of the sintered ferrite sheets 10 and 20.

Figure 5:
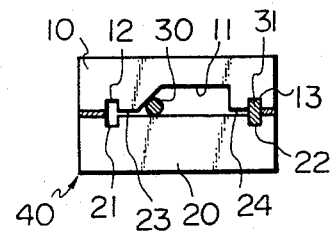
FIG. 5 illustrates another step and shows a nonmagnetic bonding mass placed in the grooves, outside of and adjacent to effective gaps.

Referring to FIG. 5 bonding masses 30 and 31 in the form of a rod or sheet are placed in the channel groove 11 and the partition grooves 13 and 22, respectively. The bonding mass consists of one material selected from the group consisting of glass and enamel. The term of "glass" used herein should not be construed to designate only a usual silicate glass but should be construed to include any inorganic nonmagnetic material flowable at such a temperature as to cause no serious deterioration of the properties of the ferromagnetic material. The bonding mass 30 is placed adjacent to the effective gap 23 and at the extremity of the channel groove 11, while the bonding mass 31 is placed adjacent to the effective gap 24 and in the grooves 22, 13.

Figure 6:
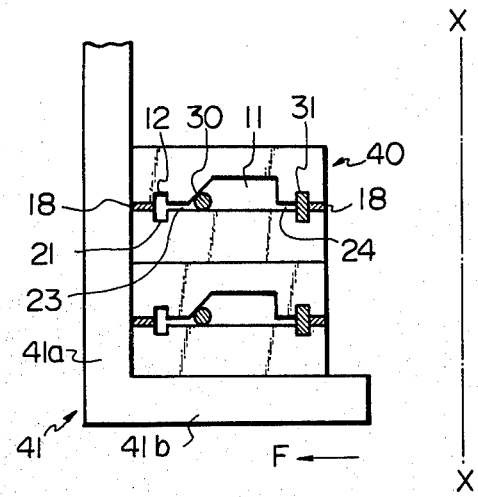
FIG. 6 illustrates another step and shows stacked ferrite members by the aid of a jig.

Referring to FIG. 6, the assembled ferrite sheets 40 are vertically stacked in the jig of a centrifugal type heating furnace having the rotation axis X—X. During the rotation of the jig 41 around the rotation axis X—X, a centrifugal force F is applied to the bonding masses 30 and 31. It is to be noted in the arrangement of the assembled ferrite sheets 40 that the assembled ferrite sheets 40 are at an offset position with respect to the rotation axis X—X and further the bonding masses 30, 31, the effective gaps 23, 24 and the grooves (12, 21), 11 are successively arranged in the direction of the centrifugal force F.

Figure 7:
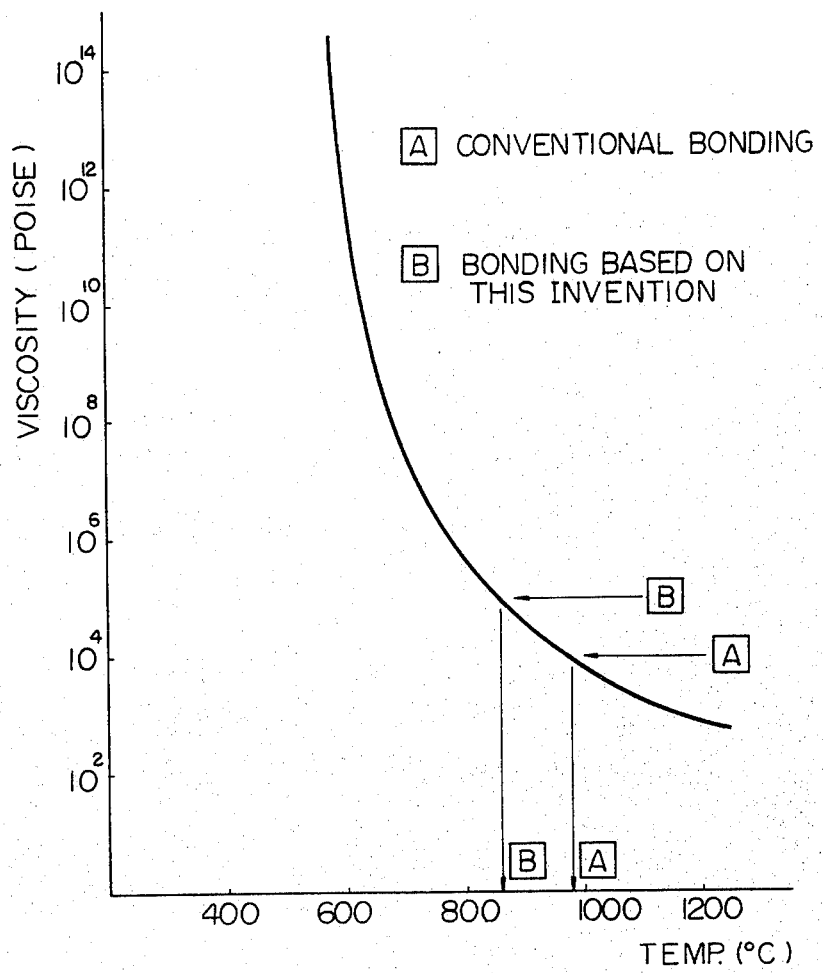
FIG. 7 is a graph indicating a temperature dependence of viscosity of a glass.

Referring to FIG. 7, the viscosity of the glass having the following composition is illustrated versus temperature. The glass is composed of
30% of $SiO_2$,
2% of $PbO$,
12% of $B_2O_3$,
50% of $BaO$,
2% of $ZnO$, and
4% of $Al_2O_3$.

When this glass is filled by means of the capillary action, the values of temperature and viscosity of molten glass, which are selected in the light of properties of magnetic heads, are 980° C. and $10^4$ poise, respectively (c.f. $\boxed{A}$-$\boxed{A}$ in FIG. 7). On the other hand, in the method of the present invention ($\boxed{B}$-$\boxed{B}$) the temperature of molten glass is 860° C. and is therefore not detrimental for the magnetic and mechanical properties of the ferromagnetic material, as compared with the conventional method ($\boxed{A}$-$\boxed{A}$). In addition, since the viscosity of $10^5$ poise according to the method of the present invention is higher than the viscosity of $10^4$ poise according to the conventional method, the tendency of the bubble formation is decreased in the present invention as compared with the conventional method.

Figure 8:
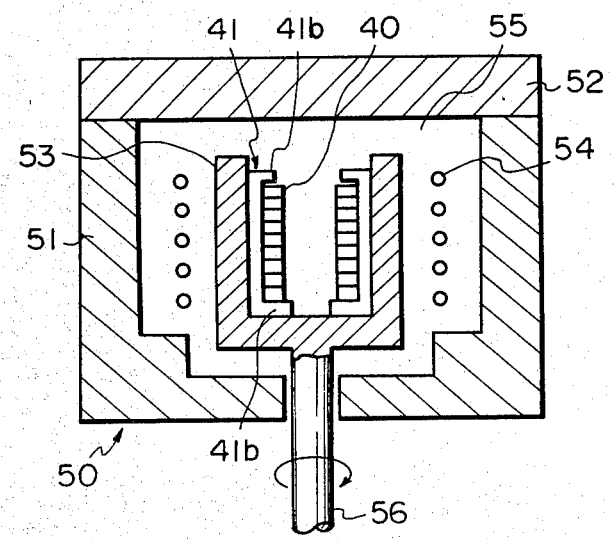
FIG. 8 is a vertical cross sectional view of a centrifugal heating furnace according to a preferable embodiment of the present invention.

Referring to FIG. 8, a centrifugal type heating furnace 50 is provided with a wall 51 and a cover 52 made of heat-insulating material and constituting the vessel. The wall 51 covered by the cover 52 at the top opening thereof defines therein a furnace chamber 55. A driving shaft 56 passes through the bottom slot of the wall 51 and is detachably connected to the rotatable support 53 which is rotated at high speed in the furnace chamber 55 by means of the driving shaft 56. In the furnace chamber a heater 54 is located between the inner surface of the wall 51 and the outer wall of the rotatable support 53. Since the rotatable support 53 is caused to rotate, the heater 54 must be positioned away from the outermost periphery of the rotating movement trace of the wall 53.

The jig 41 is inserted into the rotatable support 53. A vertical wall part of the jib 41 acts as a stopper 41a (FIG. 6) holding the assembled ferrite sheets 40 at a position against the centrifugal force F. It is preferable to fix the assembled ferrite sheets 40 between the lateral lugs 41b. The jig 41 is inserted from above into the rotatable support 53 and is fixedly mounted on the rotatable support by appropriate means.

The heater 54 is actuated while the rotatable support 53 is rotated, and therefore the temperature of the assembled ferrite sheets 40 including the bonding masses is increased, during the application of centrifugal force to the bonding masses, from ambient temperature to a softening point of the bonding masses. The bonding masses are therefore forced to flow into the effective gaps 23, 24 (FIG. 6) at such a low temperature that the bonding masses being not subjected to the centrifugal force is not caused to flow into the small effective gaps having a width of from 1 to 20 microns due to high viscosity of the bonding masses.

Figure 9:
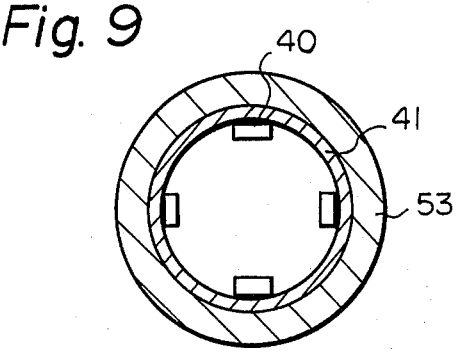
FIG. 9 is a schematic plan view of the assembled ferrite members arranged in a centrifugal heating furnace.
Figure 10:
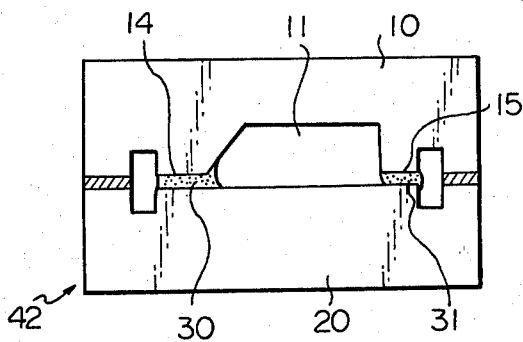
FIG. 10 illustrates another step of the manufacturing method and shows the ferrite members, in which the gap filling with the bonding mass is completed.

Referring to FIG. 9, the assembled ferrite sheets 40 are arranged around the inner wall of the jig 41, so as to effectively utilize the inner space of the jig for the production of annular portions of magnetic heads.

As a result of the forced flow of the bonding masses, the bonding masses 30 and 31 are filled within the effective gaps and thus between the confronting gap surfaces of the sintered ferrite sheets 10 and 20. The filled bonding masses are uniform and free from bubbles, because they are forced to flow due to the centrifugal force.

When the centrifugal force is 10 G, the viscosity of the bonding masses may be ten times higher than that in the prior art methods and thus the heating temperature of the bonding masses can be correspondingly reduced as compared to that of the prior art methods. This suppresses the mutual diffusion between the bonding masses 30, 31 and the sintered ferrite sheets 10, 20 and thus the magnetic- and mechanical-property deterioration of the confronting gap surfaces of the sintered ferrite sheets 10, 20 which are crucial for the characteristics of the magnetic heads.

Figure 11:
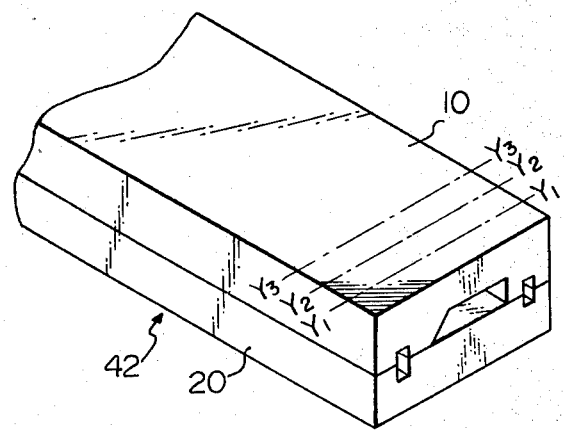
FIG. 11 illustrates the final cutting step and shows the assembled and bonded ferrite members to be cut along the chain lines.

Referring to FIG. 11, the cutting lines $Y_1, Y_2, Y_3, \ldots$ of the sintered ferrite sheets 10, 20 are illustrated. After the fusion-bonding of the sintered ferrite sheets 10, 20 by the filled bonding masses followed by cooling, the bonded ferrite sheets 42 are mechanically cut along the cutting lines $Y_1, Y_2, Y_3, \ldots$ at a required width. A number of components of magnetic heads are thus obtained. A cutter and the like are used for the mechanical cutting.

The present invention is further explained by way of the example.

Annular portions of magnetic heads were produced under the following conditions.

A. Composition of glass
 $SiO_2$ 30%
 PbO 2%
 $B_2O_3$ 12%
 BaO 50%
 ZnO 2%
 $Al_2O_3$ 4%

B. Gap width
 1 μm

C. Necessary flow length of glass
 2 mm

D. A number of the annular portions treated at one batch of a centrifugal type heating furnace
 approximately 100

E. Inner diameter of the rotatable support 53 (FIG. 8)
 0.4 m

G. Rotation number of the rotatable support 53 (FIG. 8)
 300 rpm (Approximately 20 G is added to the glass melt at the bonding parts of the annular portions of magnetic heads)

H. Heating temperature
 860° C.

As a result of the production under the conditions mentioned above, approximately 98% of glass was flown into the effective gaps of annular portions of magnetic heads. This percentage value is higher than 90% in the conventional process, in which the centrifugal force is not applied to the glass melt.

We claim:

1. A method for manufacturing annular portions of magnetic heads composed of two magnetic circuit elements consisting of ferromagnetic material and having confronting gap surfaces with an extremely small gap therebetween filled with nonmagnetic material bonding the circuit elements together, comprising the steps of:
   grooving at least one ferromagnetic bodies to form said ferromagnetic circuit elements;
   assembling said ferromagnetic circuit elements with each other in such a manner that at least one spacer is selectively located between the confronting gap surfaces so as to leave an effective gap for the magnetic material-filled gap;
   placing a nonmagnetic bonding mass selected from the group consisting of glass and enamel in at least one of said grooves, outside of and adjacent to said effective gap;
   placing said assembled ferromagnetic circuit elements in a furnace;
   heating said assembled ferromagnetic circuit elements to a temperature which causes said nonmagnetic bonding mass to be flowable while applying a centrifugal force to said nonmagnetic bonding mass, thereby causing a forced flow of said nonmagnetic bonding mass into said effective gap;
   cooling said heated ferromagnetic members; and;
   subsequently mechanically cutting the bonded ferromagnetic circuit elements into a number of portions of the magnetic heads having the requisite gap width.

2. A method according to claim 1, wherein said centrifugal force is in the range of from 5 to 50 G.

3. A method according to claim 2, comprising rotating said assembled ferromagnetic circuit elements are rotated substantially horizontally in said heating step under the application of said centrifugal force.

4. A method according to claim 3, wherein said assembled ferromagnetic circuit elements are located at an offset position with respect to the rotation axis of the substantially horizontal rotation.

5. A method according to claim 4, wherein further comprising, in the placing step in the furnace, vertically stacking the ferromagnetic circuit elements with each other.

* * * * *